United States Patent
Song et al.

(10) Patent No.: US 9,428,663 B2
(45) Date of Patent: *Aug. 30, 2016

(54) INDIRECT PRINTING APPARATUS EMPLOYING SACRIFICIAL COATING ON INTERMEDIATE TRANSFER MEMBER

(71) Applicant: XEROX CORPORATION

(72) Inventors: Guiqin Song, Milton (CA); Gordon Sisler, St. Catharines (CA); Brynn Dooley, Toronto (CA); Qi Zhang, Milton (CA); Suxia Yang, Mississauga (CA); Valerie M. Farrugia, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/288,633

(22) Filed: May 28, 2014

(65) Prior Publication Data
US 2015/0343797 A1 Dec. 3, 2015

(51) Int. Cl.
C09D 11/38 (2014.01)
B41J 2/01 (2006.01)

(52) U.S. Cl.
CPC .............. *C09D 11/38* (2013.01); *B41J 2/01* (2013.01); *B41J 2002/012* (2013.01)

(58) Field of Classification Search
CPC ...... C09D 11/38; B41J 2/01; B41J 2002/012
USPC ........................................................ 347/103
See application file for complete search history.

(56) References Cited

U.S. PATENT DOCUMENTS

| 4,339,553 | A | 7/1982 | Yoshimura et al. |
| 4,970,098 | A | 11/1990 | Ayala-Esquilin et al. |
| 4,997,642 | A | 3/1991 | Curtis et al. |
| 5,145,518 | A | 9/1992 | Winnik et al. |
| 5,146,087 | A | 9/1992 | VanDusen |
| 5,202,265 | A | 4/1993 | LaMora |
| 5,208,630 | A | 5/1993 | Goodbrand et al. |
| 5,225,900 | A | 7/1993 | Wright |
| 5,231,135 | A | 7/1993 | Machell et al. |
| 5,256,193 | A | 10/1993 | Winnik et al. |
| 5,271,764 | A | 12/1993 | Winnik et al. |
| 5,275,647 | A | 1/1994 | Winnik |
| 5,286,286 | A | 2/1994 | Winnik et al. |

(Continued)

FOREIGN PATENT DOCUMENTS

| EP | 2228690 A1 | 9/2010 |
| WO | 2005047385 A1 | 5/2005 |

OTHER PUBLICATIONS

Dow, Dow Surfactants, http://www.dow.com/surfactants/products/second.htm, retrieved Mar. 10, 2014, pp. 1-2.

(Continued)

*Primary Examiner* — Henok Legesse
(74) *Attorney, Agent, or Firm* — MH2 Technology Law Group LLP

(57) ABSTRACT

A sacrificial coating composition for an image transfer member in an aqueous ink imaging system. The sacrificial coating composition comprises a latex comprising polymer particles dispersed in a continuous liquid phase; at least one hygroscopic material; at least one surfactant; and water.

9 Claims, 7 Drawing Sheets

(56) References Cited

U.S. PATENT DOCUMENTS

| | | |
|---|---|---|
| 5,301,044 A | 4/1994 | Wright |
| 5,378,574 A | 1/1995 | Winnik et al. |
| 5,385,803 A | 1/1995 | Duff et al. |
| 5,464,703 A | 11/1995 | Ferrar et al. |
| 5,474,852 A | 12/1995 | Fitzgerald et al. |
| 5,494,702 A | 2/1996 | Blaine et al. |
| 5,539,038 A | 7/1996 | Katsen et al. |
| 5,543,177 A | 8/1996 | Morrison et al. |
| 5,547,759 A | 8/1996 | Chen et al. |
| 5,554,480 A | 9/1996 | Patel et al. |
| 5,593,807 A | 1/1997 | Sacripante et al. |
| 5,621,022 A | 4/1997 | Jaeger et al. |
| 5,629,416 A | 5/1997 | Neigel et al. |
| 5,695,878 A | 12/1997 | Badesha et al. |
| 5,700,568 A | 12/1997 | Badesha et al. |
| 5,736,520 A | 4/1998 | Bey et al. |
| 5,744,200 A | 4/1998 | Badesha et al. |
| 5,750,204 A | 5/1998 | Badesha et al. |
| 5,753,307 A | 5/1998 | Badesha et al. |
| 5,841,456 A | 11/1998 | Takei et al. |
| 5,945,245 A | 8/1999 | Mychajlowskij et al. |
| 6,020,300 A | 2/2000 | Tcheou et al. |
| 6,042,227 A | 3/2000 | Meinhardt et al. |
| 6,051,562 A | 4/2000 | Chamberlain et al. |
| 6,103,815 A | 8/2000 | Mammino et al. |
| 6,156,858 A | 12/2000 | Keoshkerian et al. |
| 6,221,137 B1 | 4/2001 | King et al. |
| 6,348,509 B1 | 2/2002 | Reeve |
| 6,586,100 B1 | 7/2003 | Pickering et al. |
| 7,172,276 B2 | 2/2007 | Breton et al. |
| 7,202,883 B2 | 4/2007 | Breton et al. |
| 7,281,790 B2 | 10/2007 | Mouri et al. |
| 7,294,377 B2 | 11/2007 | Gervasi et al. |
| 7,374,812 B2 | 5/2008 | Mizuno |
| 7,608,325 B2 | 10/2009 | Rasch et al. |
| 7,767,011 B2 | 8/2010 | Bedford et al. |
| 7,780,286 B2 | 8/2010 | Yahiro |
| 8,038,284 B2 | 10/2011 | Hori et al. |
| 8,136,936 B2 | 3/2012 | Hook et al. |
| 8,142,557 B2 | 3/2012 | Belelie et al. |
| 8,215,762 B2 | 7/2012 | Ageishi |
| 8,247,066 B2 | 8/2012 | Wu |
| 8,268,399 B2 | 9/2012 | Gervasi et al. |
| 8,350,879 B2 | 1/2013 | Larson et al. |
| 8,500,269 B2 | 8/2013 | Morita |
| 8,919,252 B2 | 12/2014 | Lestrange et al. |
| 9,011,594 B1 | 4/2015 | Kanungo et al. |
| 9,022,546 B1 | 5/2015 | Breton et al. |
| 9,126,430 B2 | 9/2015 | Liu |
| 9,138,985 B1* | 9/2015 | Yang ............... B41J 2/0057 |
| 9,174,432 B2 | 11/2015 | Liu et al. |
| 9,187,587 B2 | 11/2015 | Kanungo et al. |
| 9,193,209 B2 | 11/2015 | Dooley et al. |
| 9,211,697 B2 | 12/2015 | Dooley et al. |
| 9,227,393 B2 | 1/2016 | Song et al. |
| 9,259,915 B2 | 2/2016 | Dooley et al. |
| 9,273,218 B2 | 3/2016 | Liu |
| 9,303,135 B2 | 4/2016 | Eliyahu et al. |
| 2002/0064648 A1 | 5/2002 | Schlueter, Jr. et al. |
| 2003/0067528 A1 | 4/2003 | Chowdry et al. |
| 2003/0233952 A1 | 12/2003 | Pan et al. |
| 2003/0233953 A1 | 12/2003 | Pan et al. |
| 2003/0234840 A1 | 12/2003 | Pan et al. |
| 2004/0158056 A1 | 8/2004 | Hiemstra et al. |
| 2004/0253436 A1 | 12/2004 | Heeks et al. |
| 2005/0018027 A1 | 1/2005 | Pan et al. |
| 2006/0105117 A1 | 5/2006 | Kim et al. |
| 2007/0207186 A1 | 9/2007 | Scanlon et al. |
| 2007/0207269 A1 | 9/2007 | Woodhall et al. |
| 2008/0032072 A1 | 2/2008 | Taniuchi et al. |
| 2008/0055381 A1 | 3/2008 | Doi et al. |
| 2009/0110942 A1 | 4/2009 | Henderson-Rutgers et al. |
| 2009/0237479 A1 | 9/2009 | Yamashita et al. |
| 2011/0018925 A1 | 1/2011 | Ohara |
| 2011/0025752 A1 | 2/2011 | Law et al. |
| 2011/0122195 A1 | 5/2011 | Kovacs et al. |
| 2011/0122210 A1 | 5/2011 | Sambhy et al. |
| 2011/0269849 A1 | 11/2011 | Yao |
| 2012/0039648 A1 | 2/2012 | Sambhy et al. |
| 2012/0042518 A1 | 2/2012 | Law et al. |
| 2012/0083530 A1 | 4/2012 | Mai et al. |
| 2012/0103212 A1 | 5/2012 | Stowe et al. |
| 2012/0140009 A1 | 6/2012 | Kanasugi et al. |
| 2012/0162312 A1 | 6/2012 | Ahl et al. |
| 2012/0251685 A1 | 10/2012 | Wang-Nolan et al. |
| 2012/0274914 A1 | 11/2012 | Stowe et al. |
| 2012/0283098 A1 | 11/2012 | Zhang et al. |
| 2012/0301818 A1 | 11/2012 | Gilmartin et al. |
| 2013/0266803 A1 | 10/2013 | Dooley et al. |
| 2013/0272763 A1 | 10/2013 | Moorlag et al. |
| 2014/0060352 A1 | 3/2014 | Gervasi et al. |
| 2014/0060357 A1 | 3/2014 | Hsieh |
| 2014/0060359 A1 | 3/2014 | Kanungo et al. |
| 2014/0060360 A1 | 3/2014 | Moorlag et al. |
| 2014/0060361 A1 | 3/2014 | Gervasi et al. |
| 2014/0060363 A1 | 3/2014 | Kelly et al. |
| 2014/0060365 A1 | 3/2014 | Gervasi et al. |
| 2014/0154377 A1 | 6/2014 | Wang-Nolan et al. |
| 2014/0168330 A1 | 6/2014 | Liu et al. |
| 2014/0307800 A1 | 10/2014 | Sole Rojals et al. |
| 2015/0004861 A1 | 1/2015 | Gervasi et al. |
| 2015/0022602 A1 | 1/2015 | Landa et al. |
| 2015/0085036 A1 | 3/2015 | Liu |
| 2015/0085039 A1 | 3/2015 | Liu |
| 2015/0116414 A1 | 4/2015 | Eliyahu et al. |
| 2015/0119510 A1 | 4/2015 | Eliyahu et al. |
| 2015/0165758 A1* | 6/2015 | Sambhy ............... B41J 2/01 428/201 |
| 2015/0258778 A1 | 9/2015 | Dooley et al. |
| 2015/0267078 A1 | 9/2015 | Dooley |
| 2015/0275022 A1 | 10/2015 | Chen et al. |
| 2015/0291847 A1 | 10/2015 | Condello et al. |
| 2015/0315403 A1 | 11/2015 | Song et al. |
| 2015/0315409 A1 | 11/2015 | Song et al. |
| 2016/0083606 A1 | 3/2016 | Sisler et al. |
| 2016/0083607 A1 | 3/2016 | Sisler et al. |
| 2016/0083609 A1 | 3/2016 | Sisler et al. |
| 2016/0083636 A1 | 3/2016 | Yoshida et al. |
| 2016/0089875 A1 | 3/2016 | Song et al. |

OTHER PUBLICATIONS

Dow, Material Safety Data Sheet, TERGITOL(TM) TMN-6 (90% AG), The Dow Chemical Company, Feb. 12, 2003, pp. 1-15.
Song et al., "Film-Forming Hydrophilic Polymers for Transfix Printing Process", U.S. Appl. No. 14/266,484, filed Apr. 30, 2014.
Liu et al., "Wetting Enhancement Coating on Intermediate Transfer Member (ITM) for Aqueous Inkjet Intermediate Transfer Architecture", U.S. Appl. No. 13/716,892, filed Dec. 17, 2012.
Chu-Heng Liu, "Coating for Aqueous Inkjet Transfer", U.S. Appl. No. 14/032,996, filed Sep. 20, 2013.
Chu-Heng Liu, "System and Method for Image Receiving Surface Treatment in an Indirect Inkjet Printer", U.S. Appl. No. 14/032,945, filed Sep. 20, 2013.
Chu-Heng Liu, "Coating for Aqueous Inkjet Transfer", U.S. Appl. No. 14/033,093, filed Sep. 20, 2013.
Varun Sambhy et al., "Indirect Printing Apparatus Employing Sacrificial Coating on Intermediate Transfer Member", U.S. Appl. No. 14/105,498, filed Dec. 13, 2013.
Song et al., "Sacrificial Coating and Indirect Printing Apparatus Employing Sacrificial Coating on Intermediate Transfer Member", U.S. Appl. No. 14/266,375, filed Apr. 30, 2014.
http://www2.dupont.com/Elvanol/en_US/assets/downloads/elvanol_51_05.pdf, 2006.
Author Unknown, Byk-Silclean 3700 by BYK Chemie, http://www.specialchem4coatings.com/tds/byk-silclean-3700/byk-chemie/10414/index.aspx?q=Byk%20Silclean%203700, 2013, 1 page.
Author Unknown, "Chemical reactions on the "finished" silicone", Silicones Europe, http://www.silicones.eu/science-research/chemistry/chemical-reactions-on-the-finished-silicone, accessed Dec. 13, 2014, pp. 1-4.

(56) References Cited

OTHER PUBLICATIONS

Author Unknown, Desmodur N 3790 BA, Bayer MaterialScience, LLC., http://www.bayermaterialsciencenafta.com/products/index.cfm?mode=lit&pp_num=EB7C52DD-F4EC-BDA1-6BE0225FEE5C1FDO&pg_num=EB7C5520-9065-98A0-5A4CD71113D57191&pf=0&pf=1, 2007, 1 page.

Author Unknown, "Dot Tool", Quality Engineering Associates, Inc., pp. 1-3.

Author Unknown, "Products and Properties: Desmodur/Desmophen for Coatings, Commerical Products", Bayer MaterialScience AG brochure, Edition: 2005-07 E, 28 pages.

Berset 2185, Technical Data Sheet, Mar. 14, 2012, 2 pages.

Bruce E. Kahn, "The M3D Aerosol Jet System, An Alternative to Inkjet Printing for Printed Electronics", Organic and Printed Electronics, vol. 1, Issue 1, Winter 2007, pp. 14-17.

Cabot, "Speciatly Carbon Blacks for Ultraviolet Protection & Weatherability", Cabot Corporation, 2 pages.

"Dimer Acids", Kirk-Othmer Encyclopedia of Chemical Technology, vol. 8, 4th Ed. (1992), pp. 223-237.

Dow, Product Safety Assessment, TRITON CF Series Surfactants, Dec. 16, 2012, 6 pages.

Jikei et al., "Synthesis and Properties of Hyperbranched Aromatic Polyamide Copolymers from AB and AB2 Monomers by Direct Polycondensation", Macromolecules 2000, 33, pp. 6228-6234.

Kanungo, et al., "Multilayer Imaging Blanket Coating", U.S. Appl. No. 14/576,734, filed Dec. 19, 2014.

Larson, et al., "Sacrificial Coating and Indirect Printing Apparatus Employing Sacrificial Coating on Intermediate Transfer Member", U.S. Appl. No. 14/830,557, filed Aug. 19, 2015.

Larson, et al., "Sacrificial Coating and Indirect Printing Apparatus Employing Sacrificial Coating on Intermediate Transfer Member", U.S. Appl. No. 14/867,864, filed Sep. 28, 2015.

Law et al., "Self Cleaning Polymers and Surfaces", TechConnect World Conference & Expo, Jun. 13-16, 2011, abstract of presentation, 1 page.

Ming-Kai Tse, "PIAS-II TM—A Hig-performance Portable tool for Print Quality Analysis Anytime, Anywhere", Quality Engineering Associates (QEA), Inc. pp. 1-4.

Philipp, et al., "Three Methods for In Situ Cross-Linking of Polyvinyl Alcohol Films for Application as Ion-Conducting Membranes in Potassium Hydroxide Electrolyte", NASA, Apr. 1979,18 pages.

Reddy et al., "Citric acid cross-linking of starch films," University of Nebraska—Lincoln, Faculty Publications—Textiles, Merchandising and Fashion Design, Paper 25, 2009, pp. 702-711.

Song, et al., "Sacrificial Coating and Indirect Printing Apparatus Employing Sacrificial Coating on Intermediate Transfer Member", U.S. Appl. No. 14/665,319, filed Mar. 23, 2015.

Song, "Starch crosslinking for cellulose fiber modification and starch nanoparticle formation", https://smarttech.gatech.edu/handle/1853/39524?show=full, downloaded Jan. 22, 2015, 4 pages.

Wang, et al., "Preparation of a Crosslinking Cassava Starch Adhesive and its Application in Coating Paper", BioResources, 2013, 8 (3), pp. 3574-3589.

Wikipedia, "Dicarboxylic Acid," 7 pages printed on Aug. 19, 2015.

Wikipedia, Hydrocarbon, Downloaded Mar. 2, 2016, 8 pages.

Wikipedia, "Tetracarboxylic acids", 2 pages printed on Aug. 19, 2015, https://commons.wikimedia.org/wiki/Category:Tetracarboxylic_acids.

Wikipedia, "Tricarboxylic Acid," 2 pages printed on Aug. 19, 2015.

\* cited by examiner

INDIRECT PRINTING APPARATUS EMPLOYING SACRIFICIAL COATING ON INTERMEDIATE TRANSFER MEMBER

FIELD OF THE DISCLOSURE

This disclosure relates generally to indirect inkjet printers, and in particular, to a sacrificial coating employed on an intermediate transfer member of an inkjet printer.

BACKGROUND

In aqueous ink indirect printing, an aqueous ink is jetted on to an intermediate imaging surface, which can be in the form of a blanket. The ink is partially dried on the blanket prior to transfixing the image to a media substrate, such as a sheet of paper. To ensure excellent print quality it is desirable that the ink drops jetted onto the blanket spread and become well-coalesced prior to drying. Otherwise, the ink images appear grainy and have deletions. Lack of spreading can also cause missing or failed inkjets in the printheads to produce streaks in the ink image. Spreading of aqueous ink is facilitated by materials having a high energy surface.

However, in order to facilitate transfer of the ink image from the blanket to the media substrate after the ink is dried on the intermediate imaging surface, a blanket having a surface with a relatively low surface energy is preferred. Rather than providing the desired spreading of ink, low surface energy materials tend to promote "beading" of individual ink drops on the image receiving surface.

Thus, an optimum blanket for an indirect image transfer process must tackle both the challenges of wet image quality, including desired spreading and coalescing of the wet ink; and the image transfer of the dried ink. The first challenge—wet image quality—prefers a high surface energy blanket that causes the aqueous ink to spread and wet the surface. The second challenge—image transfer—prefers a low surface energy blanket so that the ink, once partially dried, has minimal attraction to the blanket surface and can be transferred to the media substrate.

Various approaches have been investigated to provide a solution that balances the above challenges. These approaches include blanket material selection, ink design and auxiliary fluid methods. With respect to material selection, materials that are known to provide optimum release properties include the classes of silicone, fluorosilicone, fluoropolymer such as TEFLON or VITON, and certain hybrid materials. These materials have low surface energy, but provide poor wetting. Alternatively, polyurethane and polyimide have been used to improve wetting, but at the cost of ink release properties.

Identifying and developing new techniques and/or materials that improve wet image quality and/or image transfer in aqueous ink indirect printing would be considered a welcome advance in the art.

SUMMARY

An embodiment of the present disclosure is directed to a sacrificial coating composition for an image transfer member in an aqueous ink imaging system. The sacrificial coating composition comprises a latex comprising polymer particles dispersed in a continuous liquid phase; at least one hygroscopic material; at least one surfactant; and water.

Another embodiment of the present disclosure is directed to an indirect printing apparatus. The indirect printing apparatus comprises an intermediate transfer member. A sacrificial coating is made by depositing and drying a sacrificial coating composition on the intermediate transfer member. The sacrificial coating composition comprises a latex comprising polymer particles dispersed in a continuous liquid phase; at least one hygroscopic material; at least one surfactant; and water. The indirect printing apparatus further comprises a coating mechanism for forming the sacrificial coating onto the intermediate transfer member and a drying station for drying the sacrificial coating. At least one ink jet nozzle is positioned proximate the intermediate transfer member and configured for jetting ink droplets onto the sacrificial coating formed on the intermediate transfer member. An ink processing station is configured to at least partially dry the ink on the sacrificial coating formed on the intermediate transfer member. The indirect printing apparatus also includes a substrate transfer mechanism for moving a substrate into contact with the intermediate transfer member.

Yet another embodiment of the present disclosure is directed to an indirect printing process. The process comprises providing an ink composition to an inkjet printing apparatus comprising an intermediate transfer member. A sacrificial coating composition is deposited and dried on the intermediate transfer member to form a sacrificial coating. The sacrificial coating composition comprises a latex comprising polymer particles dispersed in a continuous liquid phase; at least one hygroscopic material; at least one surfactant; and water. Droplets of ink are ejected in an imagewise pattern onto the sacrificial coating. The ink is at least partially dried to form a substantially dry ink pattern on the intermediate transfer member. Both the substantially dry ink pattern and the sacrificial coating are transferred from the intermediate transfer member to a final substrate.

The sacrificial coating compositions of the present disclosure can provide one or more of the following advantages: coatings having good wettability on, for example a fluorinated polymer substrate, coatings having good ink wetting, good ink spreading, good film uniformity, tunable ink wettability, good ink pinning, image transfer member coatings exhibiting improved wet image quality and/or improved image transfer with aqueous inks, improved physical robustness or increased shelf life and/or functions as a robust overcoat yielding prints that are mechanically robust and exhibit long life, good scratch resistance, good water fastness and/or are not susceptible to biodegradation.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

DESCRIPTION OF THE EMBODIMENTS

Figure 1:
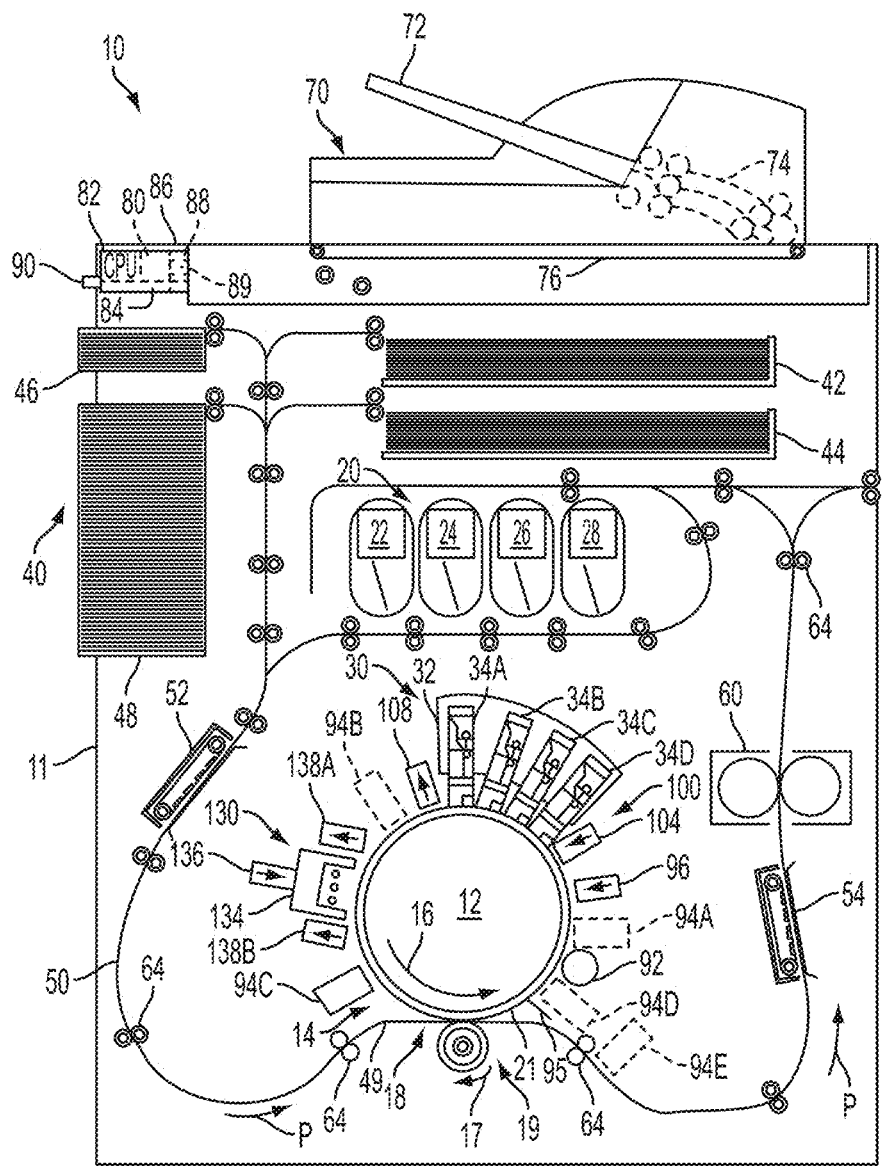
FIG. 1 is a schematic drawing of an aqueous indirect inkjet printer that prints sheet media, according to an embodiment of the present disclosure.

Reference will now be made in detail to embodiments of the present teachings, examples of which are illustrated in the accompanying drawings. In the drawings, like reference numerals have been used throughout to designate identical elements. In the following description, reference is made to the accompanying drawings that forms a part thereof, and in which is shown by way of illustration specific exemplary embodiments in which the present teachings may be practiced. The following description is, therefore, merely exemplary.

As used herein, the terms "printer," "printing device," or "imaging device" generally refer to a device that produces an image on print media with aqueous ink and may encompass any such apparatus, such as a digital copier, bookmaking machine, facsimile machine, multi-function machine, or the like, which generates printed images for any purpose. Image data generally include information in electronic form which are rendered and used to operate the inkjet ejectors to form an ink image on the print media. These data can include text, graphics, pictures, and the like. The operation of producing images with colorants on print media, for example, graphics, text, photographs, and the like, is generally referred to herein as printing or marking. Aqueous inkjet printers use inks that have a high percentage of water relative to the amount of colorant and/or solvent in the ink.

The term "printhead" as used herein refers to a component in the printer that is configured with inkjet ejectors to eject ink drops onto an image receiving surface. A typical printhead includes a plurality of inkjet ejectors that eject ink drops of one or more ink colors onto the image receiving surface in response to firing signals that operate actuators in the inkjet ejectors. The inkjets are arranged in an array of one or more rows and columns. In some embodiments, the inkjets are arranged in staggered diagonal rows across a face of the printhead. Various printer embodiments include one or more printheads that form ink images on an image receiving surface. Some printer embodiments include a plurality of printheads arranged in a print zone. An image receiving surface, such as an intermediate imaging surface, moves past the printheads in a process direction through the print zone. The inkjets in the printheads eject ink drops in rows in a cross-process direction, which is perpendicular to the process direction across the image receiving surface.

As used in this document, the term "aqueous ink" includes liquid inks in which colorant is in a solution, suspension or dispersion with a liquid solvent that includes water and/or one or more liquid solvents. The terms "liquid solvent" or more simply "solvent" are used broadly to include compounds that may dissolve colorants into a solution, or that may be a liquid that holds particles of colorant in a suspension or dispersion without dissolving the colorant.

As used herein, the term "hydrophilic" refers to any composition or compound that attracts water molecules or other solvents used in aqueous ink.

As used herein, a reference to a dried layer or dried coating refers to an arrangement of a sacrificial coating after all or a substantial portion of the liquid carrier has been removed from the composition through a drying process.

An embodiment of the present disclosure is directed to a liquid sacrificial coating composition for an image transfer member in an aqueous ink imaging system. The sacrificial coating composition comprises (a) a latex comprising polymer particles dispersed in a continuous liquid phase, (b) at least one hygroscopic material, (c) at least one surfactant and (d) water.

In an embodiment, the latex can be a colloidal suspension of polymer particles having a liquid continuous phase comprising water as a major component, such as in an amount of 50%, 70%, 80% or more by weight relative to the weight of the continuous phase. Alternatively, any other suitable liquid carrier can be employed as the continuous phase.

Any suitable polymer particles can be employed. The polymer particles comprise one or more repeating polymeric units. The polymeric units are made, for example, from monomers selected from the group consisting of acrylic acid, acrylates such as alkyl acrylates, examples of which include methyl acrylate, ethyl acrylate, n-butyl acrylate, isobutyl acrylate, dodecyl acrylate, n-octyl acrylate, lauryl acrylate, tridecyl acrylate and 2-ethylhexyl acrylate, 2-chloroethyl acrylate, β-carboxy ethyl acrylate (β-CEA), phenyl acrylate and methyl alphachloroacrylate; methacrylic acid, methacrylates such as methyl methacrylate, ethyl methacrylate, N-butyl methacrylate, lauryl methacrylate, tridecyl methacrylate, 2-ethylhexyl methacrylate and butyl methacrylate; dienes such as butadiene and isoprene; aliphatic nitriles such as methacrylonitrile and acrylonitrile; vinyl ethers such as vinyl methyl ether, vinyl isobutyl ether and vinyl ethyl ether; vinyl esters such as vinyl acetate, vinyl propionate, vinyl benzoate and vinyl butyrate; vinyl ketones such as vinyl methyl ketone, vinyl hexyl ketone and methyl isopropenyl ketone; vinylidene halides such as vinylidene chloride and vinylidene chlorofluoride; vinyl substituted heterocyclic amines such as N-vinyl indole, N-vinyl pyrrolidene, vinylpyridine, vinyl-N-methylpyridinium chloride and N-vinyl pyrrolidone; acrylamide; methacrylamide; vinyl substituted aromatic hydrocarbons such as vinyl naphthalene, styrene and p-chlorostyrene; vinyl halides such as vinyl chloride, vinyl bromide and vinyl fluoride; alkenes such as ethylene, propylene, butylene and isobutylene, and mixtures thereof. In an embodiment, the latex comprises polymer particles comprising a styrene/n-butyl acrylate/methacrylic acid terpolymer. In an embodiment, the latex comprises polymer particles comprising acrylic resins, such as those made from at least one monomer selected from the group consisting of methyl acrylate, ethyl acrylate, butyl acrylate, methacrylic acid and acrylic acid. In an embodiment, the polymer particles comprise a polyvinyl acetate copolymer.

The monomers and amounts of monomers employed to make the latex can be adjusted to provide desired properties for the transfix process. For instance, acrylic latex and/or styrene n-butyl acrylate latex can be made with different methacrylic acid (MAA) loadings to alter the properties of the latex. In one example, different methacrylic acid loadings were employed for different styrene to n-butyl acrylate ratios to provide very different glass transition temperatures and softening points. An example of loading of methacrylic acid relative to styrene and n-butyl acrylate to make the latex ranges from about 2 to about 20 wt %, relative to the total weight of the methacrylic acid, styrene and n-butyl acrylate monomers.

The latex can have any suitable solids content. Examples of suitable solids content include ranges from about 5% to about 70% by weight, such as about 10% to about 50% by weight, or about 20% to about 40% by weight, relative to the total weight of the liquid sacrificial coating composition.

The polymer of the latex can have any suitable weight average molecular weight. Examples of suitable weight average molecular weight, Mw, detected by gel permeation chromatography (GPC) range from about 3,000 to 300,000, or about 10,000 to about 100,000, or about 25,000 to about 75,000. Examples of suitable number average molecular weight, Mn, range from about 1,000 to about 100,000, such as about 2,000 to 50,000, or about 5,000 to about 15,000.

Latex properties can be adjusted to provide any desired properties suitable for the aqueous transfix printing process. For example, the glass transition temperatures, Tg, of the polymer in the latex can range from about −45° C. to about 100° C., such as about −35° C. to 85° C., or about −15° C. to about 55° C. In an example, the viscosity of the latex is from about 3 cps to 800 cps such as about 5 cps to 500 cps, or about 10 cps to 200 cps at 25° C. In an example, the pH of the latex ranges from about 1.5 to about 12, such as about 3 to about 10. In an example, the softening point of the polymer in the latex ranges from about 60° C. to about 200° C., such as about 100° C. to about 170° C., or about 120° C. to about 160° C.

In an example, the D50 particle size of the polymer particle in latex ranges from about 20 to about 300 nm, such as about 50 nm to about 200 nm, such as about 100 nm to about 150 nm; and the particle size distribution ranges from about 5 to about 50 nm. The gel content (insoluble portion in toluene) in the latex ranges, for example, from 0 to about 20.0%

The chemical structure of the latex containing coating can be tailored to fine-tune the wettability and release characteristics of the sacrificial coating from the underlying ITM surface. This can be accomplished by employing one or more hygroscopic materials and one or more surfactants in the sacrificial coating composition.

Any suitable hygroscopic material (also referred to herein as a humectant) can be employed. In addition to potentially modifying the surface characteristics of the coating, the hygroscopic material can function as a plasticizer. In an embodiment, the at least one hygroscopic material is selected from the group consisting of glycerol, sorbitol, vinyl alcohol such as ethylene vinyl alcohol, propylene glycol, hexylene glycol, butylene glycol, xylitol, maltito, polymeric polyols such as polydextrose, glyceryl triacetate, urea and alpha-hydroxy acids (AHA's). A single hydroscopic material or a plurality of hygroscopic materials can be employed.

Any suitable surfactants can be employed. In an embodiment, the at least one surfactant is selected from the group consisting of an anionic surfactant, a nonionic surfactant, a siloxane surfactant and a fluorosurfactant. In an embodiment, a nonionic surfactant having an HLB value ranging from about 4 to about 14 can be employed. A single surfactant can be used. Alternatively, multiple surfactants, such as two, three or more surfactants, can be used. In an embodiment, the surfactant is a blend of at least 2 species of non-ionic surfactant, one with a low HLB value ranging from 4 to 8 and a second with a high HLB value ranging from 9 to 14.

Examples of suitable surfactants include anionic surfactants (such as sodium lauryl sulfate (SLS), Dextrol OC-40, Strodex PK 90, ammonium lauryl sulfate, potassium lauryl sulfate, sodium myreth sulfate and sodium dioctyl sulfosuccinate series), non ionic surfactants (such as sulfynol 104 series, sulfynol 400 series, dynol 604, dynol 810, envirogem 360, secondary) alcohol ethoxylate series such as Tergitol 15-s-7, tergitol 15-s-9, TMN-6, TMN-100x and tergitol NP-9, Triton X-100 etc.) and cationic surfactants (such as Chemguard S-106A, Chemguard S-208M, Chemguard S-216M. Some fluorinated or silicone surfactants can be used in systems such as PolyFox TMPF-136A, 156A, 151N Chemguard S-761p, S-764p Silsurf A008, Siltec C-408, BYK 345, 346, 347, 348 and 349. Polyether siloxanne copolymer TEGO Wet-260, 270 500 etc. Some amphoteric fluorinated surfactants can also be used such as alkyl betaine fluorosurfactant or alkyl amine oxide fluorosurfactant such as Chemguard S-500 and Chemguard S-111. The amount of surfactant is from about 0.01 weight percent of the sacrificial coating to about 2.0 weight percent of the sacrificial coating.

The ingredients of the sacrificial coating can be mixed in any suitable manner to form a composition that can be coated onto the intermediate transfer member. The ingredients can be mixed in any suitable amounts. For example, the latex can be added in an amount of from about 0.5 to about 30, or from about 2 to about 20, or from about 5 to about 10 weight percent based upon the total weight of the coating mixture. The surfactants can be present in an amount of from about 0.01 to about 2, or from about 0.1 to about 1.5, or from about 0.5 to about 1 weight percent, based upon the total weight of the coating mixture. The hygroscopic material can be present in an amount of from about 0.5 to about 10, or from about 2 to about 8, or from about 3 to about 5 weight percent, based upon the total weight of the coating mixture.

As will be discussed in greater detail below, the sacrificial coating composition can be applied to an intermediate transfer member ("ITM"), where it dries to form a solid film. The coating can have a higher surface energy and/or be more hydrophilic than the base ITM, which is usually a low surface energy material, such as, for example, a polysiloxane, such as polydimethylsiloxane or other silicone rubber material, fluorosilicone, TEFLON, or combinations thereof.

In embodiments, the sacrificial coating can first be applied or disposed as a wet coating on the intermediate transfer member. A drying or curing process can then be employed. In embodiments, the wet coating can be heated at an appropriate temperature for the drying and curing, depending on the material or process used. For example, the wet coating can be heated to a temperature ranging from about 30° C. to about 120° C. for about 0.01 to about 100 seconds or from about 0.1 second to about 60 seconds. In embodiments, after the drying and curing process, the sacrificial coating can have a thickness ranging from about 0.02 micrometer to about 10 micrometers, or from about 0.02 micrometer to about 5 micrometers, or from about 0.05 micrometer to about 1 micrometers.

The sacrificial coating can be applied to the intermediate transfix member by any suitable method including, but not limited to spray coating, spin coating, flow coating and/or blade techniques. In exemplary embodiments, an air atomization device such as an air brush or an automated air/liquid spray can be used for spray coating. In another example, a programmable dispenser can be used to apply the coating material to conduct a flow coating.

In an embodiment, the sacrificial coating can cover a portion of a major surface of the intermediate transfer member. The major outer surface of the intermediate transfer member can comprise, for example, silicone or a fluorinated polymer.

It has been found that the sacrificial coating overcomes the wet image quality problem discussed above by providing an ink wetting surface on the intermediate transfer member. The coatings may also improve the image cohesion significantly to enable excellent image transfer.

FIG. 1 illustrates a high-speed aqueous ink image producing machine or printer 10, according to an embodiment of the present disclosure. As illustrated, the printer 10 is an indirect printer that forms an ink image on a surface of a blanket 21 mounted about an intermediate rotating member 12 and then transfers the ink image to media passing through a nip 18 formed between the blanket 21 and the transfix roller 19. The surface 14 of the blanket 21 is referred to as the image receiving surface of the blanket 21 and the rotating member 12 since the surface 14 receives a sacrificial coating and the aqueous ink images that are transfixed to print media during a printing process. A print cycle is now described with reference to the printer 10. As used in this document, "print cycle" refers to the operations of a printer to prepare an imaging surface for printing, ejection of the ink onto the prepared surface, treatment of the ink on the imaging surface to stabilize and prepare the image for transfer to media, and transfer of the image from the imaging surface to the media.

The printer 10 includes a frame 11 that supports directly or indirectly operating subsystems and components, which are described below. The printer 10 includes an intermediate transfer member, which is illustrated as rotating imaging drum 12 in FIG. 1, but can also be configured as a supported endless belt. The imaging drum 12 has an outer blanket 21 mounted about the circumference of the drum 12. The blanket moves in a direction 16 as the member 12 rotates. A transfix roller 19 rotatable in the direction 17 is loaded against the surface of blanket 21 to form a transfix nip 18, within which ink images formed on the surface of blanket 21 are transfixed onto a print medium 49. In some embodiments, a heater in the drum 12 (not shown) or in another location of the printer heats the image receiving surface 14 on the blanket 21 to a temperature in a range of, for example, approximately 50° C. to approximately 70° C. The elevated temperature promotes partial drying of the liquid carrier that is used to deposit the sacrificial coating and of the water in the aqueous ink drops that are deposited on the image receiving surface 14.

The blanket is formed of a material having a relatively low surface energy to facilitate transfer of the ink image from the surface of the blanket 21 to the print medium 49 in the nip 18. Such materials include polysiloxanes, fluorosilicones, fluoropolymers such as VITON or TEFLON and the like. A surface maintenance unit (SMU) 92 removes residual ink left on the surface of the blanket 21 after the ink images are transferred to the print medium 49. The low energy surface of the blanket does not aid in the formation of good quality ink images because such surfaces do not spread ink drops as well as high energy surfaces.

Figure 2:
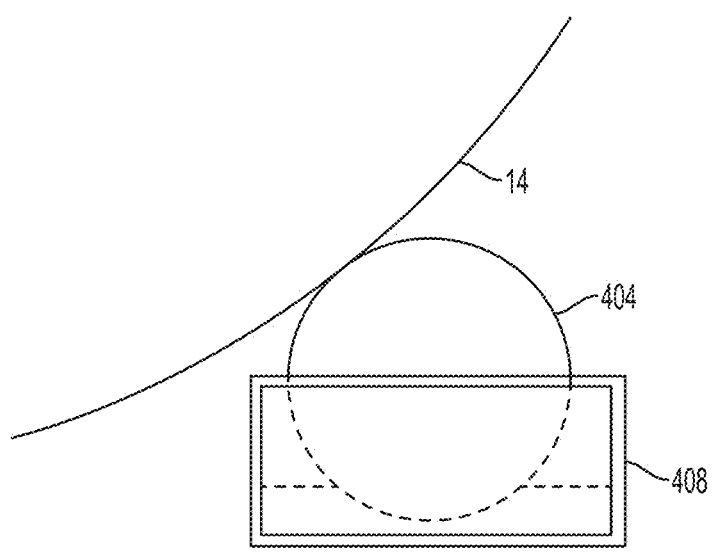
FIG. 2 is a schematic drawing of a surface maintenance unit that applies a sacrificial coating to a surface of an intermediate transfer member in an inkjet printer, according to an embodiment of the present disclosure.

In an embodiment more clearly depicted in FIG. 2, the SMU 92 includes a coating applicator, such as a donor roller 404, which is partially submerged in a reservoir 408 that holds a sacrificial coating composition. The donor roller 404 rotates in response to the movement of the image receiving surface 14 in the process direction. The donor roller 404 draws the liquid sacrificial coating composition from the reservoir 408 and deposits a layer of the composition on the image receiving surface 14. As described below, the sacrificial coating composition is deposited as a uniform layer having any desired thickness. Examples include thicknesses ranging from about 0.1 µm to about 10 µm. The SMU 92 deposits the sacrificial coating composition on the image receiving surface 14. After a drying process, the dried sacrificial coating substantially covers the image receiving surface 14 before the printer ejects ink drops during a print process. In some illustrative embodiments, the donor roller 404 is an anilox roller or an elastomeric roller made of a material, such as rubber. The SMU 92 can be operatively connected to a controller 80, described in more detail below, to enable the controller to operate the donor roller, as well as a metering blade and a cleaning blade, selectively to deposit and distribute the coating material onto the surface of the blanket and to remove un-transferred ink and any sacrificial coating residue from the surface of the blanket 21.

Referring back to FIG. 1, the printer 10 includes a dryer 96 that emits heat and optionally directs an air flow toward the sacrificial coating composition that is applied to the image receiving surface 14. The dryer 96 facilitates the evaporation of at least a portion of the liquid carrier from the sacrificial coating composition to leave a dried layer on the image receiving surface 14 before the intermediate transfer member passes the printhead modules 34A-34D to receive the aqueous printed image.

The printer 10 can include an optical sensor 94A, also known as an image-on-drum ("IOD") sensor, which is configured to detect light reflected from the blanket surface 14 and the sacrificial coating applied to the blanket surface as the member 12 rotates past the sensor. The optical sensor 94A includes a linear array of individual optical detectors that are arranged in the cross-process direction across the blanket 21. The optical sensor 94A generates digital image data corresponding to light that is reflected from the blanket surface 14 and the sacrificial coating. The optical sensor 94A generates a series of rows of image data, which are referred to as "scanlines," as the intermediate transfer member 12 rotates the blanket 21 in the direction 16 past the optical sensor 94A. In one embodiment, each optical detector in the optical sensor 94A further comprises three sensing elements that are sensitive to wavelengths of light corresponding to red, green, and blue (RGB) reflected light colors. Alternatively, the optical sensor 94A includes illumination sources that shine red, green, and blue light or, in another embodiment, the sensor 94A has an illumination source that shines white light onto the surface of blanket 21 and white light detectors are used. The optical sensor 94A shines complementary colors of light onto the image receiving surface to enable detection of different ink colors using the photodetectors. The image data generated by the optical sensor 94A can be analyzed by the controller 80 or other processor in the printer 10 to identify the thickness of the sacrificial coating on the blanket and the area coverage. The thickness and coverage can be identified from either specular or diffuse light reflection from the blanket surface and/or coating. Other optical sensors, such as 94B, 94C, and 94D, are similarly configured and can be located in different locations around the blanket 21 to identify and evaluate other parameters in the printing process, such as missing or inoperative inkjets and ink image formation prior to image drying (94B), ink image treatment for image transfer (94C), and the efficiency of the ink image transfer (94D). Alternatively, some embodiments can include an optical sensor to generate additional data that can be used for evaluation of the image quality on the media (94E).

The printer 10 includes an airflow management system 100, which generates and controls a flow of air through the print zone. The airflow management system 100 includes a printhead air supply 104 and a printhead air return 108. The printhead air supply 104 and return 108 are operatively connected to the controller 80 or some other processor in the printer 10 to enable the controller to manage the air flowing through the print zone. This regulation of the air flow can be through the print zone as a whole or about one or more printhead arrays. The regulation of the air flow helps prevent evaporated solvents and water in the ink from condensing on the printhead and helps attenuate heat in the print zone to reduce the likelihood that ink dries in the inkjets, which can clog the inkjets. The airflow management system 100 can also include sensors to detect humidity and temperature in the print zone to enable more precise control of the temperature, flow, and humidity of the air supply 104 and return 108 to ensure optimum conditions within the print zone. Controller 80 or some other processor in the printer 10 can also enable control of the system 100 with reference to ink coverage in an image area or even to time the operation of the system 100 so air only flows through the print zone when an image is not being printed.

The high-speed aqueous ink printer 10 also includes an aqueous ink supply and delivery subsystem 20 that has at least one source 22 of one color of aqueous ink. Since the illustrated printer 10 is a multicolor image producing machine, the ink delivery system 20 includes, for example, four (4) sources 22, 24, 26, 28, representing four (4) different colors CYMK (cyan, yellow, magenta, black) of aqueous inks. In the embodiment of FIG. 1, the printhead system 30 includes a printhead support 32, which provides support for a plurality of printhead modules, also known as print box units, 34A through 34D. Each printhead module 34A-34D effectively extends across the width of the blanket and ejects ink drops onto the surface 14 of the blanket 21. A printhead module can include a single printhead or a plurality of printheads configured in a staggered arrangement. Each printhead module is operatively connected to a frame (not shown) and aligned to eject the ink drops to form an ink image on the coating on the blanket surface 14. The printhead modules 34A-34D can include associated electronics, ink reservoirs, and ink conduits to supply ink to the one or more printheads. In the illustrated embodiment, conduits (not shown) operatively connect the sources 22, 24, 26, and 28 to the printhead modules 34A-34D to provide a supply of ink to the one or more printheads in the modules. As is generally familiar, each of the one or more printheads in a printhead module can eject a single color of ink. In other embodiments, the printheads can be configured to eject two or more colors of ink. For example, printheads in modules 34A and 34B can eject cyan and magenta ink, while printheads in modules 34C and 34D can eject yellow and black ink. The printheads in the illustrated modules are arranged in two arrays that are offset, or staggered, with respect to one another to increase the resolution of each color separation printed by a module. Such an arrangement enables printing at twice the resolution of a printing system only having a single array of printheads that eject only one color of ink. Although the printer 10 includes four printhead modules 34A-34D, each of which has two arrays of printheads, alternative configurations include a different number of printhead modules or arrays within a module.

After the printed image on the blanket surface 14 exits the print zone, the image passes under an image dryer 130. The image dryer 130 includes a heater, such as a radiant infrared, radiant near infrared and/or a forced hot air convection heater 134, a dryer 136, which is illustrated as a heated air source 136, and air returns 138A and 138B. The infrared heater 134 applies infrared heat to the printed image on the surface 14 of the blanket 21 to evaporate water or solvent in the ink. The heated air source 136 directs heated air over the ink to supplement the evaporation of the water or solvent from the ink. In one embodiment, the dryer 136 is a heated air source with the same design as the dryer 96. While the dryer 96 is positioned along the process direction to dry the sacrificial coating, the dryer 136 is positioned along the process direction after the printhead modules 34A-34D to at least partially dry the aqueous ink on the image receiving surface 14. The air is then collected and evacuated by air returns 138A and 138B to reduce the interference of the air flow with other components in the printing area.

As further shown, the printer 10 includes a print medium supply and handling system 40 that stores, for example, one or more stacks of paper print mediums of various sizes. The print medium supply and handling system 40, for example, includes sheet or substrate supply sources 42, 44, 46, and 48. In the embodiment of printer 10, the supply source 48 is a high capacity paper supply or feeder for storing and supplying image receiving substrates in the form of cut print mediums 49, for example. The print medium supply and handling system 40 also includes a substrate handling and transport system 50 that has a media pre-conditioner assembly 52 and a media post-conditioner assembly 54. The printer 10 includes an optional fusing device 60 to apply additional heat and pressure to the print medium after the print medium passes through the transfix nip 18. In the embodiment of FIG. 1, the printer 10 includes an original document feeder 70 that has a document holding tray 72, document sheet feeding and retrieval devices 74, and a document exposure and scanning system 76.

Operation and control of the various subsystems, components and functions of the machine or printer 10 are performed with the aid of a controller or electronic subsystem (ESS) 80. The ESS or controller 80 is operably connected to the intermediate transfer member 12, the printhead modules 34A-34D (and thus the printheads), the substrate supply and handling system 40, the substrate handling and transport system 50, and, in some embodiments, the one or more optical sensors 94A-94E. The ESS or controller 80, for example, is a self-contained, dedicated mini-computer having a central processor unit (CPU) 82 with electronic storage 84, and a display or user interface (UI) 86. The ESS or controller 80, for example, includes a sensor input and control circuit 88 as well as a pixel placement and control circuit 89. In addition, the CPU 82 reads, captures, prepares and manages the image data flow between image input sources, such as the scanning system 76, or an online or a work station connection 90, and the printhead modules 34A-34D. As such, the ESS or controller 80 is the main multi-tasking processor for operating and controlling all of the other machine subsystems and functions, including the printing process discussed below.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

Although the printer 10 in FIG. 1 is described as having a blanket 21 mounted about an intermediate rotating member 12, other configurations of an image receiving surface can be used. For example, the intermediate rotating member can have a surface integrated onto its circumference that enables an aqueous ink image to be formed on the surface. Alternatively, a blanket is configured as an endless rotating belt for formation of an aqueous image. Other variations of these structures can be configured for this purpose. As used in this document, the term "intermediate imaging surface" includes these various configurations.

Once an image or images have been formed on the blanket and coating under control of the controller 80, the illustrated inkjet printer 10 operates components within the printer to perform a process for transferring and fixing the image or images from the blanket surface 14 to media. In the printer 10, the controller 80 operates actuators to drive one or more of the rollers 64 in the media transport system 50 to move the print medium 49 in the process direction P to a position adjacent the transfix roller 19 and then through the transfix nip 18 between the transfix roller 19 and the blanket 21. The transfix roller 19 applies pressure against the back side of the print medium 49 in order to press the front side of the print medium 49 against the blanket 21 and the intermediate transfer member 12. Although the transfix roller 19 can also be heated, in the exemplary embodiment of FIG. 1, the transfix roller 19 is unheated. Instead, the pre-heater assembly 52 for the print medium 49 is provided in the media path leading to the nip. The pre-conditioner assembly 52 conditions the print medium 49 to a predetermined temperature that aids in the transferring of the image to the media, thus simplifying the design of the transfix roller. The pressure produced by the transfix roller 19 on the back side of the heated print medium 49 facilitates the transfixing (transfer and fusing) of the image from the intermediate transfer member 12 onto the print medium 49. The rotation or rolling of both the intermediate transfer member 12 and transfix roller 19 not only transfixes the images onto the print medium 49, but also assists in transporting the print medium 49 through the nip. The intermediate transfer member 12 continues to rotate to enable the printing process to be repeated.

After the intermediate transfer member moves through the transfix nip 18, the image receiving surface passes a cleaning unit that removes residual portions of the sacrificial coating and small amounts of residual ink from the image receiving surface 14. In the printer 10, the cleaning unit is embodied as a cleaning blade 95 that engages the image receiving surface 14. The blade 95 is formed from a material that wipes the image receiving surface 14 without causing damage to the blanket 21. For example, the cleaning blade 95 is formed from a flexible polymer material in the printer 10. As depicted below in FIG. 1, another embodiment has a cleaning unit that includes a roller or other member that applies a mixture of water and detergent to remove residual materials from the image receiving surface 14 after the intermediate transfer member moves through the transfix nip 18. As used herein, the term "detergent" or cleaning agent refers to any surfactant, solvent, or other chemical compound that is suitable for removing any sacrificial coating and any residual ink that may remain on the image receiving surface from the image receiving surface. One example of a suitable detergent is sodium stearate, which is a compound commonly used in soap. Another example is IPA, which is common solvent that is very effective to remove ink residues from the image receiving surface. In an embodiment, no residue of the sacrificial coating layer remains on the ITM after transferring the ink and sacrificial layer, in which case cleaning of the ITM to remove residual sacrificial coating may not be an issue.

Figure 3:
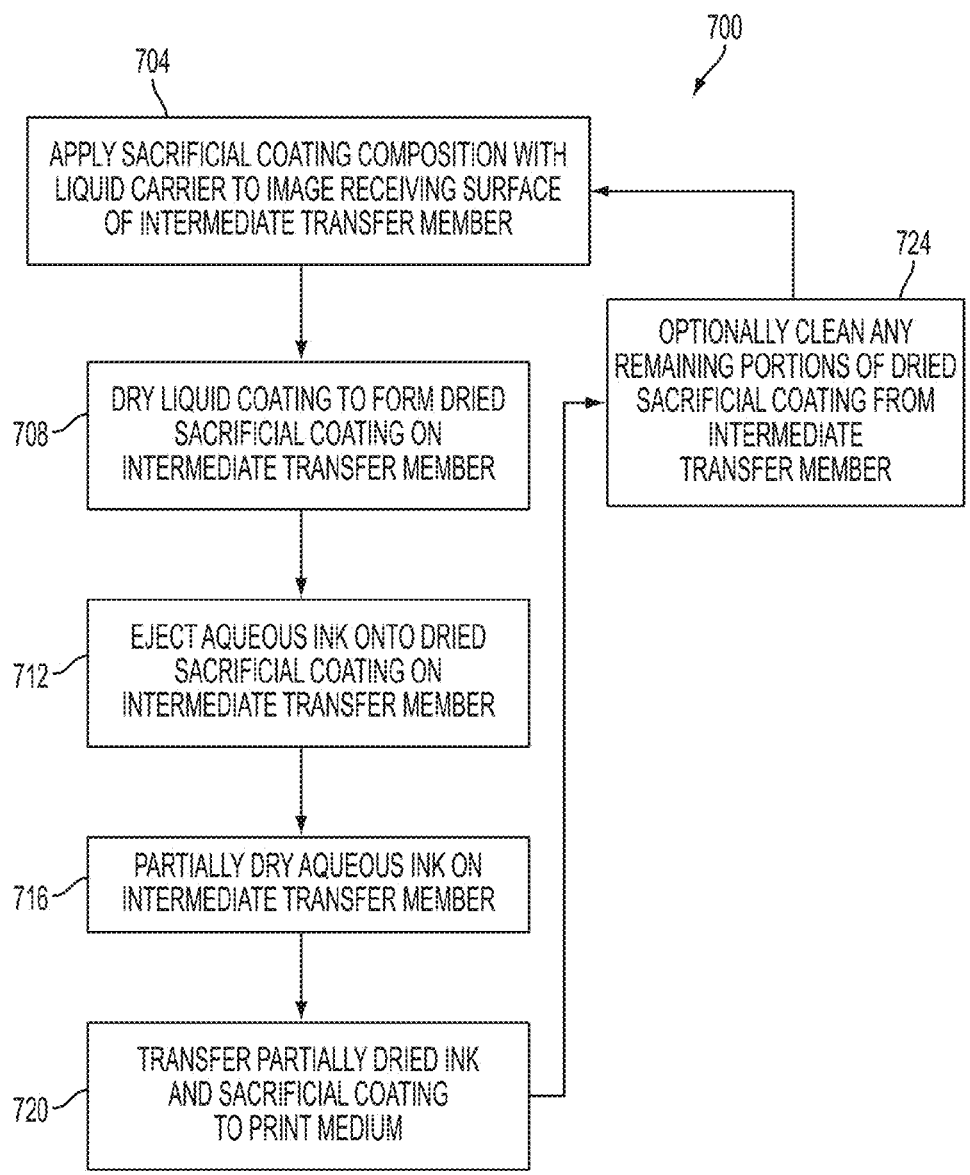
FIG. 3 is a block diagram of a process for printed images in an indirect inkjet printer that uses aqueous inks, according to an embodiment of the present disclosure.

FIG. 3 depicts a process 700 for operating an aqueous indirect inkjet printer using a sacrificial coating composition comprising the latex, as described herein, to form a dried coating on an image receiving surface of an intermediate transfer member prior to ejecting liquid ink drops onto the dried layer. In the discussion below, a reference to the process 700 performing an action or function refers to a controller, such as the controller 80 in the printer 10, executing stored programmed instructions to perform the action or function in conjunction with other components of the printer. The process 700 is described in conjunction with FIG. 1 showing the printer 10, and FIG. 4A-FIG. 4E showing the blanket and coatings, for illustrative purposes. The sacrificial coatings and processes of employing these coatings are not limited to use with printer 10, but can potentially be employed with any inkjet printer comprising an intermediate transfer member, as would be readily understood by one of ordinary skill in the art.

Process 700 begins as the printer applies a layer of a sacrificial coating composition comprising a liquid carrier to the image receiving surface of the intermediate transfer member (block 704). In the printer 10, the drum 12 and blanket 21 move in the process direction along the indicated circular direction 16 during the process 700 to receive the sacrificial coating composition.

Figure 4A:
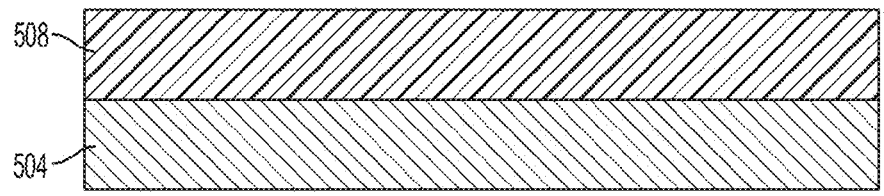
FIG. 4A is a side view of a sacrificial coating that is formed on the surface of an intermediate transfer member in an inkjet printer, according to an embodiment of the present disclosure.
Figure 4B:
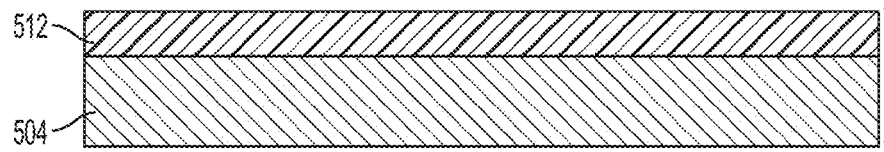
FIG. 4B is a side view of dried sacrificial coating on the surface of the intermediate transfer member after a dryer removes a portion of a liquid carrier in the sacrificial coating, according to an embodiment of the present disclosure.

In an embodiment, the liquid carrier is water or another liquid, such as alcohol, which partially evaporates from the image receiving surface and leaves a dried layer on the image receiving surface. In FIG. 4A, the surface of the intermediate transfer member 504 is covered with the sacrificial coating composition 508. The SMU 92 deposits the sacrificial coating composition on the image receiving surface 14 of the blanket 21 to form a uniform hydrophilic coating. A greater coating thickness of the sacrificial coating composition enables formation of a uniform layer that completely covers the image receiving surface, but the increased volume of liquid carrier in the thicker coating requires additional drying time or larger dryers to remove the liquid carrier to form a dried layer. Thinner coatings of the sacrificial coating composition require the removal of a smaller volume of the liquid carrier to form the dried layer, but if the sacrificial coating is too thin, then the coating may not fully cover the image receiving surface. In certain embodiments the sacrificial coating composition with the liquid carrier is applied at a thickness of between approximately 1 μm and 10 μm. Process 700 continues as a dryer in the printer dries the sacrificial coating composition to remove at least a portion of the liquid carrier and to form a dried layer on the image receiving surface (block 708). In the printer 10 the dryer 96 applies radiant heat and optionally includes a fan to circulate air onto the image receiving surface of the drum 12 or belt 13. FIG. 4B depicts the dried layer 512. The dryer 96 removes a portion of the liquid carrier, which decreases the thickness of the layer that is formed on the image receiving surface. In the printer 10 the thickness of the dried layer 512 can be any suitable desired thickness. Example thicknesses range from about 0.1 μm to about 3 μm in different embodiments, and in certain specific embodiments from about 0.1 to about 0.5 μm The dried sacrificial coating 512 is also referred to as a "skin" layer. The dried sacrificial coating 512 has a uniform thickness that covers substantially all of the portion of the image receiving surface that receives aqueous ink during a printing process. As described above, the dried sacrificial coating 512 covers the image receiving surface of intermediate transfer member 504. The dried sacrificial coating 512 has a comparatively high level of adhesion to the image receiving surface of intermediate transfer member 504, and a comparatively low level of adhesion to a print medium that contacts the dried layer 512. As described in more detail below, when aqueous ink drops are ejected onto portions of the dried layer 512, a portion of the water and other solvents in the aqueous ink permeates the dried layer 512.

Process 700 continues as the image receiving surface with the hydrophilic skin layer moves past one or more printheads that eject aqueous ink drops onto the dried sacrificial coating and the image receiving surface to form a latent aqueous printed image (block 712). The printhead modules 34A-34D in the printer 10 eject ink drops in the CMYK colors to form the printed image.

The sacrificial coating 512 is substantially impermeable to the colorants in the ink 524, and the colorants remain on the surface of the dried layer 512 where the aqueous ink spreads. The spread of the liquid ink enables neighboring aqueous ink drops to merge together on the image receiving surface instead of beading into individual droplets as occurs in traditional low-surface energy image receiving surfaces.

Referring again to FIG. 3, the process 700 continues with a partial drying process of the aqueous ink on the intermediate transfer member (block 716). The drying process removes a portion of the water from the aqueous ink and the sacrificial coating, also referred to as the skin layer, on the intermediate transfer member so that the amount of water that is transferred to a print medium in the printer does not produce cockling or other deformations of the print medium. In the printer 10, the heated air source 136 directs heated air toward the image receiving surface 14 to dry the printed aqueous ink image. In some embodiments, the intermediate transfer member and blanket are heated to an elevated temperature to promote evaporation of liquid from the ink. For example, in the printer 10, the imaging drum 12 and blanket 21 are heated to a temperature of 50° C. to 70° C. to enable partial drying of the ink in the dried layer during the printing process. As depicted in FIG. 4D, the drying process forms a partially dried aqueous ink 532 that retains a reduced amount of water compared to the freshly printed aqueous ink image of FIG. 4C.

The drying process increases the viscosity of the aqueous ink, which changes the consistency of the aqueous ink from a low-viscosity liquid to a higher viscosity tacky material. The drying process also reduces the thickness of the ink 532. In an embodiment, the drying process removes sufficient water so that the ink contains less that 5% water or other solvent by weight, such as less than 2% water, or even less than 1% water or other solvent, by weight of the ink after the drying process but prior to transfer to the print medium.

Process 700 continues as the printer transfixes the latent aqueous ink image from the image receiving surface to a print medium, such as a sheet of paper (block 720). In the printer 10, the image receiving surface 14 of the drum 12 engages the transfix roller 19 to form a nip 18. A print medium, such as a sheet of paper, moves through the nip between the drum 12 and the transfix roller 19. The pressure in the nip transfers the latent aqueous ink image and a portion of the dried layer to the print medium. After passing through the transfix nip 18, the print medium carries the printed aqueous ink image. As depicted in FIG. 4E, a print medium 536 carries a printed aqueous ink image 532 with the sacrificial coating 512 covering the ink image 532 on the surface of the print medium 536. The sacrificial coating 512 provides protection to the aqueous ink image from scratches or other physical damage while the aqueous ink image 532 dries on the print medium 536.

During process 700, the printer cleans any residual portions of the sacrificial coating 512 that may remain on the image receiving surface after the transfixing operation (block 724). In one embodiment, a fluid cleaning system 395 uses, for example, a combination of water and a detergent with mechanical agitation on the image receiving surface to remove the residual portions of the sacrificial coating 512 from the surface of the belt 13. In the printer 10, a cleaning blade 95, which can be used in conjunction with water, engages the blanket 21 to remove any residual sacrificial coating 512 from the image receiving surface 14. The cleaning blade 95 is, for example, a polymer blade that wipes residual portions of the sacrificial coating 512 from the blanket 21.

During a printing operation, process 700 returns to the processing described above with reference to block 704 to apply the sacrificial coating to the image receiving surface, print additional aqueous ink images, and transfix the aqueous ink images to print media for additional printed pages in the print process. The illustrative embodiment of the printer 10 operates in a "single pass" mode that forms the dried layer, prints the aqueous ink image and transfixes the aqueous ink image to a print medium in a single rotation or circuit of the intermediate transfer member. In alternative embodiments, an inkjet employs a multi-pass configuration where the image receiving surface completes two or more rotations or circuits to form the dried layer and receive the aqueous ink image prior to transfixing the printed image to the print medium.

Figure 4C:
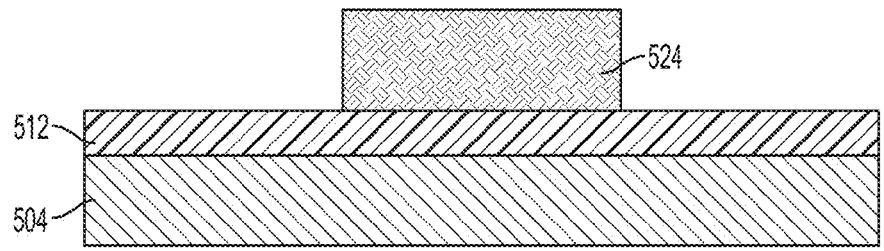
FIG. 4C is a side view of a portion of an aqueous ink image that is formed on the dried sacrificial coating on the surface of the intermediate transfer member, according to an embodiment of the present disclosure.
Figure 4D:
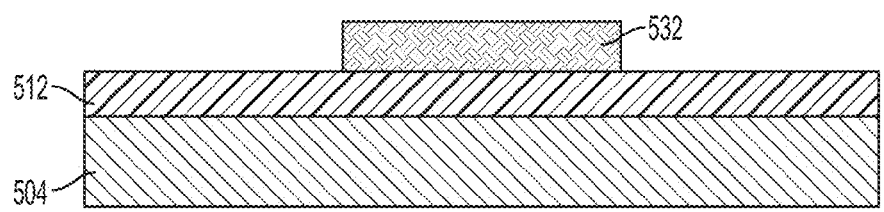
FIG. 4D is a side view of a portion of the aqueous ink image that is formed on the dried sacrificial coating after a dryer in the printer removes a portion of the water in the aqueous ink, according to an embodiment of the present disclosure.
Figure 4E:
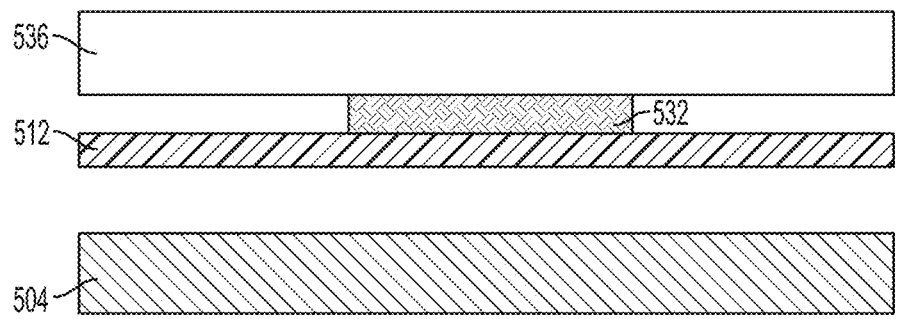
FIG. 4E is a side view of a print medium that receives the aqueous ink image and a portion of the dried layer of the sacrificial coating after a transfix operation in the inkjet printer, according to an embodiment of the present disclosure.

In some embodiments of the process 700, the printer forms printed images using a single layer of ink such as the ink that is depicted in FIG. 4C. In the printer 10, however, the multiple printhead modules enable the printer to form printed images with multiple colors of ink. In other embodiments of the process 700, the printer forms images using multiple ink colors. In some regions of the printed image, multiple colors of ink may overlap in the same area on the image receiving surface, forming multiple ink layers on the sacrificial coating layer. The method steps in FIG. 3 can be applied to the multiple ink layer circumstance with similar results.

The present disclosure is also directed to an imaged final substrate made by the aqueous transfix process described herein. As described in detail above, an ink pattern is formed on the final substrate, which can be, for example, a paper substrate or any other suitable image substrate. The sacrificial layer comprising the polymer from the latex is transfixed onto the final substrate with the ink pattern to form a protective film. The protective film can comprise any of the polymers discussed herein. For example, the protective film can comprise one or more repeating polymeric units selected from the group consisting of acrylate units, n-butyl acrylate units, methacrylate units, methyl methacrylate units, styrene units and butadiene units. The protective film can include any of the other components of the sacrificial layers that remain solid after final drying, such as the hygroscopic materials, surfactants and optional fillers or additives.

EXAMPLES

Example 1

Latex Selection

Table 1A shows two Xerox experimental styrene n-butyl acylate latex, labeled Xerox experimental latex-L and Xerox experimental latex-H, as well as some commercial latex that were employed in the examples below. These latex were compatible with the selected humectants such as glycerol or sorbitol and formed uniform and stable films on fluorinated blanket surfaces.

TABLE 1A

Various Latex for Sacrificial Coating Application

| Latex Description | Supplier | Tg (° C.) | PH | Vis (cps) | Solid (%) |
|---|---|---|---|---|---|
| Xerox experimental latex-L | Xerox | 53 | 1.8 | <50 | 39.9 |
| Xerox experimental latex-H | Xerox | 82 | 1.8 | <50 | 42.7 |
| Joncryl 74A | BASF | −16 | 8.1 | <700 | 48.5 |
| Joncryl 77 | BASF | 21 | 8.3 | 500 | 46 |
| Resyn 2920 | Celanese | 12 | 8.5 | <500 | 45.0 |
| Dur-O-Cryl 69A | Celanese | 10 | 3.0 | 50.0 | 45.0 |

Table 1B shows the ingredients of both Xerox experimental latex compositions "L" and "H". An explanation of the acronyms and other ingredient names used in Table 1B are provided below. The latex compositions can be made using an emulsion polymerization process similar to that followed in Example 7, below, except that the amount of ingredients are substituted by those of Table 1B.

bCEA—beta-carboxyethyl acrylate.
ADOD—decane-1,10-diyl diacrylate, which is a long chain hydrophobic crosslinker.
DDT#1, DDT#2—amount of 1-dodecane thiol in Monomer Feed No. 1 and Monomer Feed No. 2, respectively.
DOWFAX®—an anionic alkyldiphenyloxide disulfonate surfactant available from Dow Chemical Company of Midland, Mich.
APS—Ammonium persulfate

TABLE 1B

| Latex Type | Xerox Latex-L | Xerox Latex-H |
|---|---|---|
| Styrene (%) | 54.0 | 67.9 |
| nBA (%) | 34.0 | 18.6 |
| Methacrylic acid (%) | 12.0 | 13.5 |
| bCEA (pph on St + nBA + MAA) | 3.00 | 3.00 |
| ADOD (pph on St + nBA + MAA) | 0.35 | 0.35 |
| DDT#1 (pph on total St + nBA + MAA) | 0.620 | 0.260 |
| DDT#2 (pph on total St + nBA + MAA) | 2.440 | 2.130 |
| Dowfax (pph on St + nBA + MAA) | 1.00 | 1.00 |
| APS (pph on St + nBA + MAA) | 1.50 | 1.50 |
| Dowfax partition | 15/85 | 15/85 |
| Seed % | 1.0 | 1.0 |
| Particle Size D50 (nm) | 100.3 | 120.1 |
| Particle Size D95 (nm) | 141.1 | 172.4 |
| Zeta Potential (mV) ± STD | −64.5 ± 15.0 | −63.6 ± 10.2 |
| Conductivity (mS/cm) | 0.129 | 0.074 |
| pH | 1.80 | 1.83 |
| Solids (%) | 39.9 | 41.9 |
| Mw (k) | 43.2 | 47.4 |
| Mn (k) | 12.4 | 13.6 |
| PDI (polydispersity) | 3.5 | 3.5 |
| Tg (° C.) - onset | 52.9 | 81.8 |
| Acid Value (titration) | 95.1 | 50.7 |
| Styrene (ppm) in latex | 56 | 98 |
| nBA (ppm) in latex | 884 | 14 |
| MAA (ppm) in latex | 51 | 149 |
| % Gel Content | 3.8 | 13.4 |
| Ts (softening point ° C.) | 142.3 | 161.9 |

Example 2

Sacrificial Coating Compositions

Example 2A

Sacrificial coating compositions were prepared with Xerox experimental latex, as follows.

Example 2A-1

A sacrificial coating solution was prepared by combining and mixing 31.25 g Xerox experimental latex-L and 18.75 g glycerol into 49.75 g DI water. Next, 0.25 g Tergitol TMN-6 surfactant was added into the mixture to make it 100 g of solution.

Example 2A-2

A sacrificial coating solution was prepared by combining and mixing 3.251 g Xerox experimental latex-L and 18.75 g sorbitol into 49.75 g DI water. Next, 0.25 g Tergitol TMN-6 surfactant was added into the mixture to make it 100 g of solution.

Example 2A-3

A sacrificial coating solution was prepared by combining and mixing 31.25 g Xerox experimental latex-H and 18.75 g glycerol into 49.75 g DI water. Next, 0.25 g Tergitol TMN-6 surfactant was added into the mixture to make it 100 g of solution.

Example 2A-4

A sacrificial coating solution was prepared by combining and mixing 31.25 g Xerox experimental latex-H and 18.75 g sorbitol into 49.75 g DI water. Next, 0.25 g Tergitol TMN-6 surfactant was added into the mixture to make it 100 g of solution.

Example 2B

Sacrificial coating compositions were prepared with commercially available latex, as follows. The loading ratio of polymer solids from the latex ranged from about 13 to 15% by weight based on the total weight of the sacrificial coating composition in examples 2B-1 and 2B-2.

Example 2B-1

A sacrificial coating solution was prepared by combining and mixing 31.25 g BASF Joncryl 74A latex and 18.75 g sorbitol into 49.75 g DI water. Next, 0.25 g Tergitol TMN-6 surfactant was added into the mixture to make it 100 g of solution.

Example 2B-2

A sacrificial coating solution was prepared by combining and mixing 31.25 g BASF Joncryl 77 latex and 18.75 g sorbitol into 49.75 g DI water. Next, 0.25 g Tergitol TMN-6 surfactant was added into the mixture to make it 100 g of solution.

Example 2B-3

A sacrificial coating solution was prepared by combining and mixing 31.25 g Celanese Resyn 2920 latex and 18.75 g glycerol into 49.75 g DI water. Next, 0.25 g Tergitol TMN-6 surfactant was added into the mixture to make it 100 g of solution.

Example 2B-4

A sacrificial coating solution was prepared by combining and mixing 31.25 g Celanese Dur-O-Cryl 69A latex and 18.75 g glycerol into 49.75 g DI water. Next, 0.25 g Tergitol TMN-6 surfactant was added into the mixture to make it 100 g of solution.

Example 2B-5

A sacrificial coating solution was prepared by combining and mixing 31.25 g Celanese Dur-O-Cryl 69A latex and 18.75 g sorbitol into 49.75 g DI water. Next, 0.25 g Tergitol TMN-6 surfactant was added into the mixture to make it 100 g of solution.

Example 3

Optical Microscope Images—Film Forming Property Evaluation

Sacrificial coating solution was coated on blanket substrate using a Pamarco anilox roll 165Q13 by hand. The substrate was made from fluorinated polymer (G621 manufactured by Daikin Industries, Ltd.) and a crosslinker, AO700 (aminoethyl aminopropyl trimethoxysilane from Gelest). The hotplate was setup at 65° C. while the substrate temperature was around 40-50° C. The wet film thickness was around 4-5 microns and the dry film thickness was around 200 nm to 2 microns. The coated films were dried in oven at 60° C. for 30 seconds. Example 6: Optical

Example 4

Microscope Images—Film Forming Property Evaluation

In order to make ink having good wetting and spreading on a sacrificial coating, it is desirable to achieve a continuous uniform film with the sacrificial coating solution. The optical microscope images were taken on the film which was coated on a substrate made from fluorinated polymer (G621 crosslinked with AO700), similar to that of Example 3.

Figure 5:
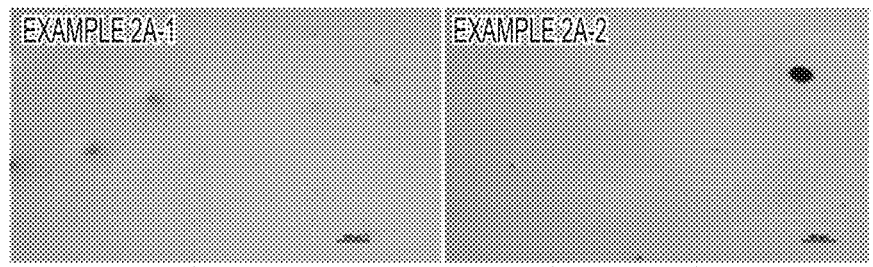
FIGS. 5, 6 and 7 show results of film forming evaluations for example sacrificial coating compositions of the present disclosure.

As described above, Example 2A-1 and 2A-2 were prepared using Xerox Experimental latex-L, but with different humectants. Example 2A-1 was loaded with 18.75% glycerol; Example 2A-2 was loaded with 18.75% sorbitol. Both formulations form a good quality continuous, uniform film, as shown in FIG. 5.

Figure 6:
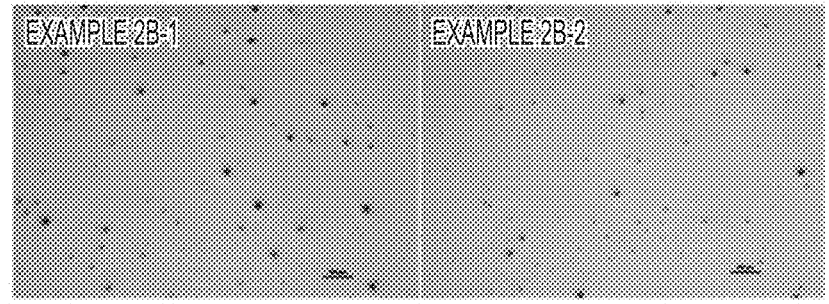

Also as described above, Example 2B-1 and Example 2B-2 were prepared using the same humectant (sorbitol) but with different latex. Both formulations generated a continuous film, although Joncryl 77 demonstrated more uniformity of coating, as shown in FIG. 6.

Figure 7:
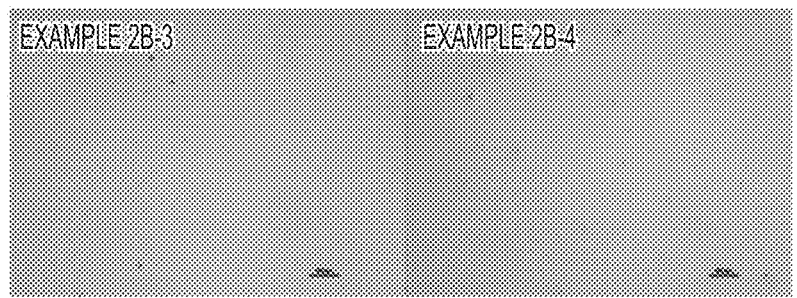

Example 2B-3 and Example 2B-4, as described above, were prepared using the same humectant (glycerol) but with different latex. The surface uniformity for both formulations was very similar, as can be seen in FIG. 7.

Example 5

Fibro DAT1100 Ink Drop Evaluation—Ink and Sacrificial Coating Interaction (Ink Wetting Property)

The ink wettability was characterized by the ink droplet forming on the sacrificial coating. Fibro DAT 1100 was used to capture the ink spreading and contact angles. Lab experimental ink was applied to demonstrate the difference between sacrificial coating formulations. The ink drop size was controlled at 0.5 µl. Since the experimental ink spreading on skin is too fast and the contact angle can't be captured on most samples, only drop images are demonstrated here.

Figure 8:
FIG. 8 shows comparison of ink droplets on various surfaces, as described in the examples of the present disclosure.

The group A and B images (FIG. 8) show the comparison of ink droplet on a substrate made from fluorinated polymer (G621 crosslinked with AO700, similar to that of Example 3) without a sacrificial coating as control, and blanket coated with sacrificial solutions comprising Xerox experimental latex (example 2A-1, 2A-2, 2A-3 and 2A-4) and commercially available latex such as Dur-O-Cryl 69A as in examples 2B-1 to 2B-5). Example 2A-1 and Example 2B-4 comprised glycerol as humectant, while Example 2A-2 and Example 2B-5 comprised sorbitol as humectant. It is clear that both latex compositions loaded with sorbitol provided proper ink wetting and spreading property while glycerol gave satellite spreading behavior with the loading as high as 18.75%. The ink wetting and spreading properties can also be controlled by the loading level of humectant. Lowering the loading level of humectant can effectively control the interaction between ink and sacrificial coating.

Example 2B-1 and Example 2B-2 comprised the same humectant (sorbitol) but with two different latex compositions. Example 2B-1 comprises Joncryl 74A and Example 2B-2 comprised Joncryl 77. These two formulations containing different latex showed much better ink wetting and spreading behavior compared to the no coating control.

Example 6

Air Brush Transfer Test

The same lab experimental ink for contact angle measurement was used for transfer test. The ink was sprayed on the coated blanket by air brush. The transfer condition was 320° F., 50 psi and 5 seconds dwell time. The ink was transferred from blanket to 120 gsm Digital Color Elite Gloss paper.

Figure 9:
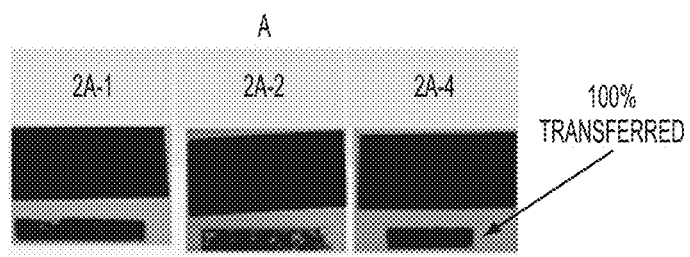
FIGS. 9-11 show image transfer test results, as described in the examples of the present disclosure It should be noted that some details of the figure have been simplified and are drawn to facilitate understanding of the embodiments rather than to maintain strict structural accuracy, detail, and scale.

The group A images of FIG. 9 show the transfer results. The top image is the blanket after ink was transferred and the bottom image is the DCEG paper after ink was transferred. There is no residual ink on blanket coated with Example 2A-4 solution comprising Xerox experimental latex-H and sorbitol. There are some residual ink on blanket coated with Example 2A-1 and Example 2A-2 comprising Xerox experimental latex-L. Around 80-90% ink transferred for these two formulations.

Figure 10:
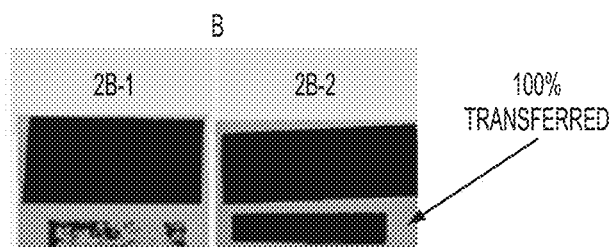

The group B images of FIG. 10 show the transfer on formulation with BASF latex. The top image is the blanket after transfer and the bottom image is the DCEG paper after ink transfer. There is no residual ink on the blanket substrate coated with Example 2B-2 solution comprising BASF Joncryl 77 latex and sorbitol. There is some residual ink on blanket coated with Example 2B-1 solution comprising BASF Joncryl 74A latex and sorbitol.

Figure 11:
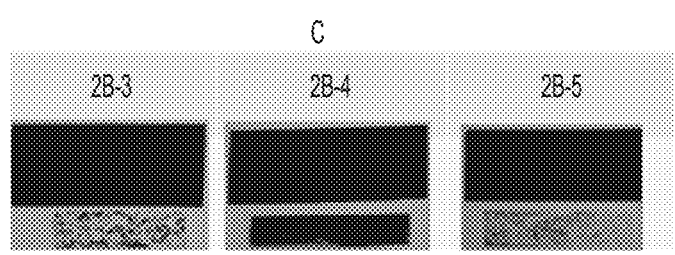

The group C images of FIG. 11 show the transfer on formulation with Celanese latex. The top image is the blanket after transfer and the bottom image is the DCEG paper after ink transfer. There is almost no residual ink on blanket coated with Example 2B-4 solution comprising Celanese Dur-O-Cryl 69A latex and glycerol. There is some residual ink on blanket coated with Example 2B-3 and Example 2B-5.

Example 7

Preparation of an Emulsion Polymerization Latex

A surfactant solution of 1.99 grams of DOWFAX® 2A1 (anionic alkyldiphenyloxide disulfonate) and 285.43 grams of de-ionized water was prepared by mixing for 10 minutes in a stainless steel holding tank. The holding tank was then purged with nitrogen for 5 minutes before transferring the mixture into a reactor. The reactor was then continuously purged with nitrogen while being stirred at 450 RPM. The reactor was then heated up to 80° C. at a controlled rate. Separately, 4.38 grams of ammonium persulfate initiator was dissolved in 45.54 grams of deionized water.

Separately, a monomer emulsion was prepared by adding 229.13 grams of styrene, 62.69 grams of butyl acrylate, 45.39 grams of methacrylic acid, 10.12 grams of beta CEA, 2.07 grams of 1-dodecanethiol, and 1.18 grams of 1,10-decanediol diacrylate ("ADOD") to a premix of 11.27 grams of DOWFAX® 2A1 in 152.91 grams of deionized water. 1% of the emulsion (4.3 grams) was then slowly added into the reactor containing the aqueous surfactant phase at 80° C. to form the "seeds" while being purged with nitrogen. The initiator solution was then slowly charged into the reactor. The monomer emulsion was split into two aliquots. The first aliquot of 252.2 grams of the monomer emulsion (monomer feed no. 1) was initially fed into the reactor at 2.03 grams/minute. The second aliquot of 259.8 grams of the monomer emulsion (monomer feed no. 2) was mixed with 2.45 grams of dichlorodiphenyltrichloroethane ("DDT") and added to the reactor at 2.89 grams per minute. Once all of the monomer emulsion was charged into the reactor, the temperature was held at 80° C. for an additional two hours to complete the reaction. Full cooling was then applied, and the reactor temperature was reduced to 25° C. The product was collected into a holding tank and sieved with a 25 µm screen. The particle size was then measured by a NANOTRAC® U2275E particle size analyzer to have a D50 of 131.3 nm and a D95 of 187.9 nm.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. An indirect printing apparatus comprising:
   an intermediate transfer member;
   a sacrificial coating on the intermediate transfer member, the sacrificial coating made by depositing and drying a sacrificial coating composition on the intermediate transfer member, the sacrificial coating composition comprising:
       a latex comprising polymer particles dispersed in a continuous liquid phase;
       at least one hygroscopic material;
       at least one surfactant; and
       water;
   a coating mechanism for forming the sacrificial coating onto the intermediate transfer member;
   a drying station for drying the sacrificial coating;
   at least one ink jet nozzle positioned proximate the intermediate transfer member and configured for jetting ink droplets onto the sacrificial coating formed on the intermediate transfer member;

an ink processing station configured to at least partially dry the ink on the sacrificial coating formed on the intermediate transfer member; and a substrate transfer mechanism for moving a substrate into contact with the intermediate transfer member.

2. The indirect printing apparatus of claim 1, wherein the polymer particles comprise one or more repeating polymeric units selected from the group consisting of acrylic acid units, acrylate units, methacrylic acid units, methacrylate units, diene units, aliphatic nitrile units, vinyl ether units, vinyl ester units, vinyl ketone units, vinylidene halide units, vinyl substituted heterocyclic amine units, acrylamide units, methacrylamide units, vinyl substituted aromatic hydrocarbon units, vinyl halide units and alkene units.

3. The indirect printing apparatus of claim 1, wherein the latex comprises a styrene/n-butyl acrylate/methacrylic acid terpolymer.

4. The indirect printing apparatus of claim 1, wherein the latex comprises acrylic resins.

5. An indirect printing process comprising:
providing an ink composition to an inkjet printing apparatus comprising an intermediate transfer member;
depositing and drying a sacrificial coating composition on the intermediate transfer member to form a sacrificial coating, the sacrificial coating composition comprising:
a latex comprising polymer particles dispersed in a continuous liquid phase;
at least one hygroscopic material;
at least one surfactant; and
water;
ejecting droplets of ink in an imagewise pattern onto the sacrificial coating;
at least partially drying the ink to form a substantially dry ink pattern on the intermediate transfer member; and
transferring both the substantially dry ink pattern and the sacrificial coating from the intermediate transfer member to a final substrate.

6. The process of claim 5, wherein the polymer particles comprise one or more repeating polymeric units selected from the group consisting of acrylic acid units, acrylate units, methacrylic acid units, methacrylate units, diene units, aliphatic nitrile units, vinyl ether units, vinyl ester units, vinyl ketone units, vinylidene halide units, vinyl substituted heterocyclic amine units, acrylamide units, methacrylamide units, vinyl substituted aromatic hydrocarbon units, vinyl halide units and alkene units.

7. The process of claim 5, wherein the latex is a styrene/n-butyl acrylate/methacrylic acid terpolymer.

8. The process of claim 5, wherein the latex comprises acrylic resins.

9. The process of claim 5, wherein the substantially dry ink pattern comprises less than 9% water or solvent, based on the total weight of the dry ink.

* * * * *